United States Patent
Lewis et al.

(10) Patent No.: US 11,640,822 B2
(45) Date of Patent: *May 2, 2023

(54) DYNAMIC SEQUENCE-BASED ADJUSTMENT OF PROMPT GENERATION

(71) Applicant: Google LLC, Mountain View, CA (US)

(72) Inventors: Justin Lewis, Marina Del Rey, CA (US); Thomas Price, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/943,559

(22) Filed: Jul. 30, 2020

(65) Prior Publication Data
US 2020/0357404 A1 Nov. 12, 2020

Related U.S. Application Data

(63) Continuation of application No. 16/141,291, filed on Sep. 25, 2018, now Pat. No. 10,748,538.
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 9/451* (2018.02);
(Continued)

(58) Field of Classification Search
CPC ... G10L 15/22; G10L 15/30; G10L 2015/088; G10L 15/08; G10L 2015/223;
(Continued)

(56) References Cited

U.S. PATENT DOCUMENTS

2013/0275164 A1* 10/2013 Gruber .................... G10L 15/22
705/5
2014/0222436 A1 8/2014 Binder et al.
(Continued)

OTHER PUBLICATIONS

"Walmart and Google to offer voice-enabled shopping", BBC News, Aug. 23, 2017 (10 pages).
(Continued)

*Primary Examiner* — Huyen X Vo
(74) *Attorney, Agent, or Firm* — Dority & Manning, P.A.

(57) ABSTRACT

Systems and methods for dynamic sequence-based adjustment of prompt generation are provided. The system can receive a first interaction and a second interaction via a client device and identify a first sequence based on the first interaction and the second interaction. The system can map the first sequence to a node data structure and identify a node in the node data structure that matches the first sequence. The system can generate an adjusted parameter for a first digital component object responsive to a match with an attribute of the node in the node data structure. The system can execute a real-time digital component selection process among a plurality of digital component objects including the first digital component object to select the first digital component object. The system can transmit a prompt with the first digital component object to a client device to cause the client device to present the prompt.

20 Claims, 4 Drawing Sheets

Related U.S. Application Data

(60) Provisional application No. 62/563,421, filed on Sep. 26, 2017.

(51) Int. Cl.

| | |
|---|---|
| *G10L 15/08* | (2006.01) |
| *G10L 15/30* | (2013.01) |
| *G06Q 30/0601* | (2023.01) |
| *G06F 9/451* | (2018.01) |
| *G06F 16/332* | (2019.01) |
| *G06F 40/35* | (2020.01) |
| *G06F 40/205* | (2020.01) |

(52) U.S. Cl.
CPC ........ *G06F 16/3329* (2019.01); *G06F 40/205* (2020.01); *G06F 40/35* (2020.01); *G06Q 30/0601* (2013.01); *G10L 15/08* (2013.01); *G10L 15/30* (2013.01); *G10L 2015/088* (2013.01); *G10L 2015/223* (2013.01); *G10L 2015/225* (2013.01)

(58) Field of Classification Search
CPC ........... G10L 2015/225; G06F 19/3418; G06F 19/324; G06F 19/325; G06F 19/3456; G06F 19/3481; G06F 16/951; G06F 16/9535; G06F 16/13; G06F 16/2471; G06F 16/90335; G06F 16/3346; G06F 16/24578; G06F 16/285; G06F 16/3322; G06F 16/3344; G06F 16/90324; G06F 19/322; G06F 16/168; G06F 16/245; G06F 16/2465; G06F 16/322; G06F 16/3334; G06F 16/338; G06F 16/353; G06F 16/835; G06F 16/9024; G06F 16/954; G06F 19/3406; G06F 19/345; G06F 19/3487; G06F 19/363; G06F 21/6227; G06F 21/6245; G06F 2221/2107; G06F 40/20; G06F 40/211; G06F 40/279; G06F 40/289; G06F 40/295; G06F 40/30; G06F 13/00; G06F 16/2246; G06F 16/24522; G06F 16/2457; G06F 16/24575; G06F 16/248; G06F 16/90332; G06F 16/957; G06F 21/64; G06F 30/33; G06F 30/367; G06F 40/103; G06F 40/205; G06F 8/30; G06F 8/36; G06F 8/38; G06F 9/453; G06F 3/167; G06F 3/16; G06F 9/451; G06F 16/3329; G06F 16/332; G06F 40/35; G06Q 30/0601; G06Q 30/06

See application file for complete search history.

(56) References Cited

U.S. PATENT DOCUMENTS

| | | | |
|---|---|---|---|
| 2015/0142704 A1* | 5/2015 | London | G06Q 10/10 706/11 |
| 2016/0163311 A1* | 6/2016 | Crook | G10L 15/183 704/275 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).

Broussard, Mitchel, "Chatbot-Like Siri Patent Includes Intelligent Image, Video, and Audio Recognition within Messages", MacRumors, May 11, 2017 (7 pages).

Chen, Lulu Yilun, "Alibaba Challenges Google, Amazon With New Echo-Like Device", Bloomberg Technology, Jul. 5, 2017 (3 pages).

Clover, Juli, "Amazon and Google Want to Turn Their Smart Home Speakers Into Telephone Replacements", MacRumors, Feb. 15, 2017 (5 pages).

Collins, et al., "Can Twitter Save Itself?", CNET, Apr. 26, 2017, retrieved Aug. 22, 2017 from URL: https://www.cnet.com/news/twitter-q1-2017-earnings/ (3 pages).

Crist, Ry, "Logitech Harmony's Alexa skill just got a whole lot better", CNET, Jul. 13, 2017 (2 pages).

Forrest, Conner, "Essential Home wants to be bridge between Amazon's Alexis, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).

Gebhart, Andrew, "Google Home to the Amazon Echo: 'Anything you can do . . . '", CNET, May 18, 2017 (7 pages).

Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).

Golgowski, Nina, "This Burger King Ad Is Trying to Control Your Google Home Device", HuffPost, Apr. 12, 2017 (7 pages).

Google Developers, "GoogleAssistant SDK", retrieved Aug. 22, 2017 from URL: https://developers.google.com/assistant/sdk/ (4 pages).

Gurman, et al., "Apple Is Manufacturing a Siri Speaker to Outdo Google and Amazon", Bloomberg, May 31, 2017 (5 pages).

Hardwick, Tim, "Facebook Smart Speaker Coming Next Year With 15-inch Touch Panel", MacRumors, Jul. 25, 2017 (5 pages).

Kelion, Leo, "Amazon's race to make Alexa smarter", BBC News, Jul. 28, 2017 (8 pages).

Koetsier, John, "Ads on Amazon Echo: Wendy's, ESPN, And Progressive Among Brands Testing", Forbes, May 11, 2017 (2 pages).

Larson, Selena, "Google Home now recognizes your individual voice", CNN Money, San Francisco, California, Apr. 20, 2017 (3 pages).

Lee, Dave, "The five big announcements from Google I/O", BBC News, May 18, 2017 (9 pages).

Nieva, Richard, "Google Home and eBay can tell you how much that's worth", CNET, Mar. 8, 2017 (3 pages).

Notice of Allowance for U.S. Appl. No. 16/141,291 dated Apr. 20, 2020 (11 pages).

Perez, Sarah, "The first ad network for Alexa Skills shuts down following Amazon's policy changes", Tech Crunch, Jun. 15, 2017 (6 pages).

Porter, Jon, "Amazon Echo Show release date, price, news and features", Techradar, Jun. 26, 2017 (14 pages).

Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).

Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).

Purcher, Jack, "Today Google Home's Virtual Assistant can learn its Owner's voice for Security Reasons like Apple's Patent Pending Idea", Patently Apple, Apr. 20, 2017 (4 pages).

(56) References Cited

OTHER PUBLICATIONS

Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).

\* cited by examiner

DYNAMIC SEQUENCE-BASED ADJUSTMENT OF PROMPT GENERATION

CROSS-REFERENCES TO RELATED APPLICATIONS

This application claims the benefit of priority under 35 U.S.C. § 120 as a continuation of U.S. patent application Ser. No. 16/141,291, filed Sep. 25, 2018, which claims the benefit of priority under 35 U.S.C. § 119 to U.S. Provisional Patent Application No. 62/563,421, filed Sep. 26, 2017, each of which is hereby incorporated by reference herein in its entirety.

BACKGROUND

Interactions with computing devices having limited interface configurations can cause an increase in remote procedure calls or latency in response time due to reduced data availability. For example, in a voice-based computing environment, limited data can be input or output in a time period, or limited types of data can be input or output, thereby increasing the number of data requests or transmissions to perform sequential processing. The excessive network transmissions of network traffic data can also complicate data routing or degrade the quality of the response if the responding computing device is at or above its processing capacity, which may result in inefficient bandwidth utilization. The control of network transmissions corresponding to digital component objects can be complicated by the large number of digital component objects that can initiate network transmissions of network traffic data between computing devices.

SUMMARY

The present disclosure is generally directed to improving the efficiency and effectiveness of information transmission and processing over disparate computing resources. It is challenging for disparate computing resource to efficiently process, and consistently and accurately provide audio-based digital component objects in a voice-based (or other non-text based such as image or video) computing environment. For example, the disparate computing resources may not have access to the same voice or image models, or may have access to out of date or unsynchronized voice or image models that can make it challenging to accurately and consistently provide the audio-based digital component object. Further, the computing resources may perform redundant processing to select digital component objects that can be reused, thereby reducing processor utilization.

At least one aspect of the present technical solution is directed to a system of dynamic sequence-based tuning of prompt generation. The system can include a data processing system. The data processing system can include one or more processors and memory. The data processing system can include interface, a node mapper component and a content selector component. The data processing system can establish a data exchange session between a client device remote from the data processing system and the interface of the data processing system. The data processing system can detect, via the data exchange session, a first interaction between the client device remote and the interface of the data processing system. The data processing system can detect, via the data exchange session, a second interaction between the client device and the interface of the data processing system. The data processing system can identify a first sequence based on the first interaction and the second interaction. The data processing system can map the first sequence to a node data structure comprising a plurality of nodes. The data processing system can identify a node of the plurality of nodes in the node data structure that matches the first sequence. The node can have an attribute comprising a keyword tuple. The data processing system can identify, responsive to a match between the first sequence and the node in the node data structure, a plurality of digital component objects matching the keyword tuple corresponding to the attribute of the node. The data processing system can determine that a first digital component object of the plurality of digital component objects includes an adjustment parameter. The data processing system can apply the adjustment parameter to a parameter of the first digital component object to provide an adjusted parameter for the first digital component object. The data processing system can apply the adjustment parameter responsive to a match between the keyword tuple of the first digital component object and the attribute of the node in the node data structure. The data processing system can execute a real-time digital component selection process among the plurality of digital component objects, the real-time digital component selection process comprising the adjusted parameter generated for the first digital component object to result in selection of the first digital component object. The data processing system can generate a prompt based on the first digital component object. The data processing system can generate the prompt responsive to the selection of the first digital component object based on the adjusted parameter applied responsive to the match between the keyword tuple of the first digital component object and the attribute of the node in the node data structure. The data processing system can transmit the prompt to the client device to cause the client device to present the prompt and initiate a third interaction via the data exchange session.

At least one aspect of the present technical solution is directed to a method for dynamic sequence-based tuning of prompt generation. The method can include a data processing system establishing a data exchange session between a client device remote from the data processing system and an interface of the data processing system. The method can include the data processing system detecting, via the data exchange session, a first interaction between the client device remote and the interface of the data processing system. The method can include the data processing system detecting, via the data exchange session, a second interaction between the client device and the interface of the data processing system. The method can include the data processing system identifying a first sequence based on the first interaction and the second interaction. The method can include the data processing system mapping the first sequence to a node data structure comprising a plurality of nodes. The method can include the data processing system identifying a node of the plurality of nodes in the node data structure that matches the first sequence. The node can have an attribute comprising a keyword tuple. The method can include the data processing system identifying, responsive to a match between the first sequence and the node in the node data structure, a plurality of digital component objects matching the keyword tuple corresponding to the attribute of the node. The method can include the data processing system determining that a first digital component object of the plurality of digital component objects includes an adjustment parameter. The method can include the data processing system applying, responsive to a match between the keyword tuple of the first digital component object and the attribute of the node in the node data structure, the adjustment parameter to the first digital component object to provide an adjusted parameter for the first digital component object. The method can include the data processing system executing a real-time digital component selection process among the plurality of digital component objects. The real-time digital component selection process can include the adjusted parameter generated for the first digital component object to result in selection of the first digital component object. The method can include the data processing system generating, responsive to the selection of the first digital component object based on the adjusted parameter applied responsive to the match between the keyword tuple of the first digital component object and the attribute of the node in the node data structure, a prompt based on the first digital component object. The method can include the data processing system transmitting the prompt to the client device to cause the client device to present the prompt and initiate a third interaction via the data exchange session.

At least one aspect is directed to a system for dynamic sequence-based adjustment of prompt generation. The system can include a data processing system comprising one or more processors and memory that execute a node mapper component and content selector component. The data processing system can receive a first entry input via a client device. The data processing system can receive a second entry input via a client device. The data processing system can identify a first sequence based on the first entry and the second entry. The data processing system can map the first sequence to a model comprising a plurality of nodes. The data processing system can identify a node of the plurality of nodes in the model that matches the first sequence. The data processing system can identify, responsive to a match between the first sequence and the node in the model, a plurality of digital component objects comprising keyword tuples corresponding to an attribute of the node. The data processing system can determine that a first digital component object of the plurality of digital component objects includes an adjustment parameter configured to be triggered responsive to a match between a keyword tuple of the first digital component object and the attribute of the node in the model. The data processing system can trigger, responsive to the match between the keyword tuple of the first digital component object and the attribute of the node in the model, the adjustment parameter for the first digital component object to cause generation of an adjusted parameter for the first digital component object. The data processing system can execute a real-time digital component selection process among the plurality of digital component objects. The real-time digital component selection process can utilize the adjusted parameter generated for the first digital component object to result in selection of the first digital component object. The data processing system can generate, responsive to the selection of the first digital component object based on the adjusted parameter triggered responsive to the match between the keyword tuple of the first digital component object and the attribute of the node in the model, a prompt based on the first digital component object. The data processing system can transmit the prompt to a client device to cause the client device to present the prompt.

At least one aspect is directed to a method of dynamic sequence-based adjustment of prompt generation. The method can include the data processing system receiving a first entry input via a client device. The method can include the data processing system receiving a second entry input via a client device. The method can include the data processing system identifying a first sequence based on the first entry and the second entry. The method can include the data processing system mapping the first sequence to a model comprising a plurality of nodes. The method can include the data processing system identifying a node of the plurality of nodes in the model that matches the first sequence. The method can include the data processing system identifying, responsive to a match between the first sequence and the node in the model, a plurality of digital component objects comprising keyword tuples corresponding to an attribute of the node. The method can include the data processing system determining that a first digital component object of the plurality of digital component objects includes an adjustment parameter configured to be triggered responsive to a match between a keyword tuple of the first digital component object and the attribute of the node in the model. The method can include the data processing system triggering, responsive to the match between the keyword tuple of the first digital component object and the attribute of the node in the model, the adjustment parameter for the first digital component object to cause generation of an adjusted parameter for the first digital component object. The method can include the data processing system executing a real-time digital component selection process among the plurality of digital component objects. The real-time digital component selection process can utilize the adjusted parameter generated for the first digital component object to result in selection of the first digital component object. The method can include the data processing system generating, responsive to the selection of the first digital component object based on the adjusted parameter triggered responsive to the match between the keyword tuple of the first digital component object and the attribute of the node in the model, a prompt based on the first digital component object. The method can include the data processing system transmitting the prompt to a client device to cause the client device to present the prompt.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
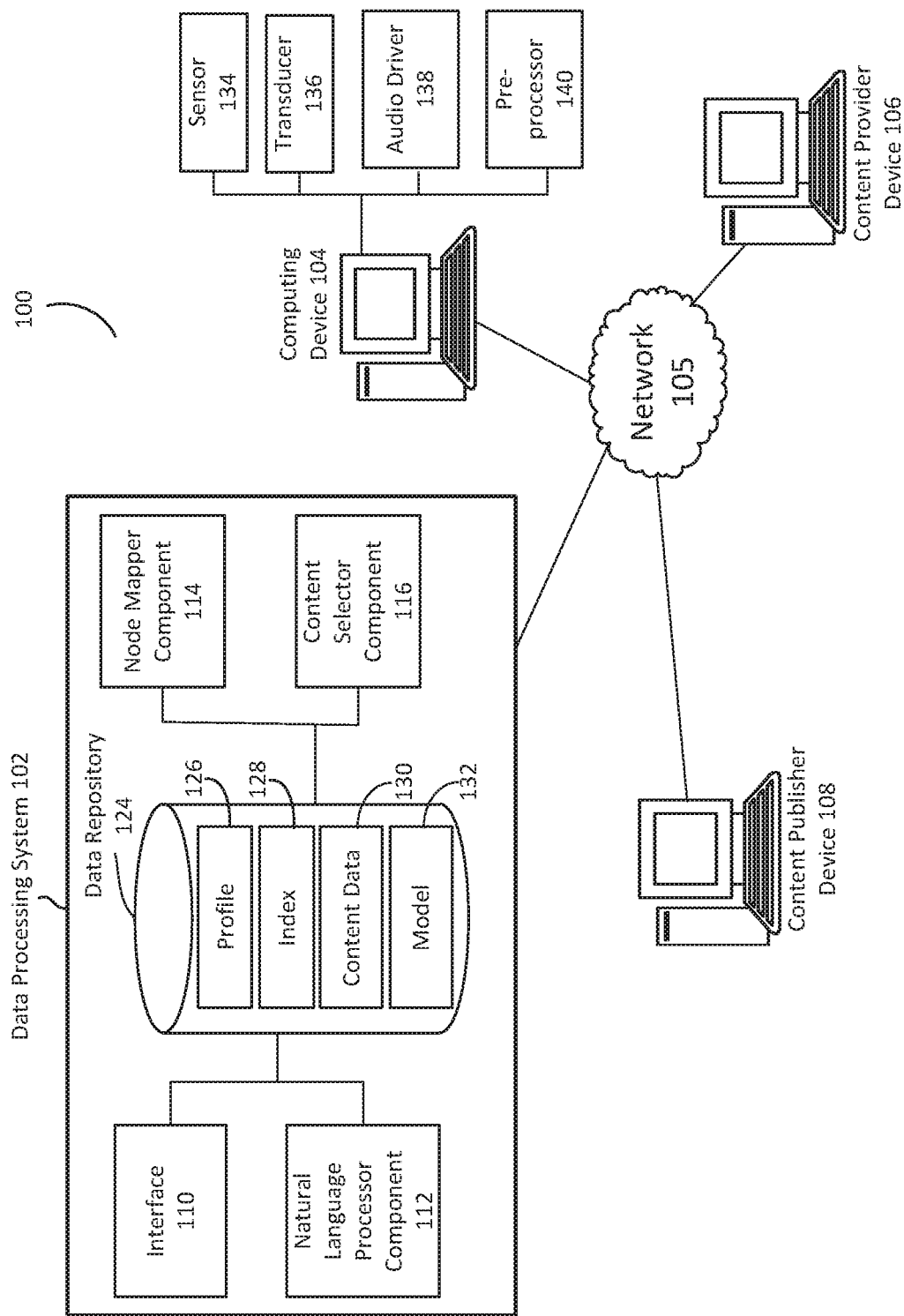
FIG. 1 is an illustration of a system for dynamic sequence-based prompt generation via a computer network.

Following below are more detailed descriptions of various concepts related to, and implementations of, methods, apparatuses, and systems of dynamic sequence-based adjustment of prompt generation. The various concepts introduced above and discussed in greater detail below may be implemented in any of numerous ways.

The present disclosure is generally directed to systems and methods for dynamic sequence-based prompt generation via a computer network. A data processing system of the present disclosure can improve the efficiency and effectiveness of information transmission and processing over disparate computing resources.

In a sequential data stream environment, such as a conversational environment provided via a digital chatbot or voice-based digital assistant, a large number of remote procedure calls ("RPCs") may be generated as a result of excessive requests for content. Each of the RPCs can trigger a real-time process to be executed on a data processing system. However, scaling up a server data farm to process the excessive requests can be resource intensive. Further, the processing of the excessive requests may be wasteful or ineffective.

Accordingly, systems and methods of the present disclosure provide a data processing system that can reduce the number of requests that are processed by using one or more techniques to filter the requests to identify requests that may be effective. Reducing the number of requests by filtering out certain requests, the data processing system can process fewer data requests, thereby reducing RPCs, processor utilization, memory utilization, or bandwidth utilization. Further, by using one or more techniques to filter the requests, the data processing system can identify high priority requests to process that can result in equally effective results, thereby increasing the efficiency of the system.

For example, specific types of data packets, data files or digital component objects are well suited for certain types of data sequences. On the web for example, advertisements can be relevant to shopping related queries. However, on digital assistants or personal assistant enabled computing devices, such as voice assistants, chat assistants or chat bots, certain types of data files can be challenging to render effectively. Further, assistant enabled or chat enabled devices cannot process certain types of queries effectively via the assistant or chat interface. Thus, the data processing system of the present disclosure can allow for content providers to adjust provide digital component objects in a sequential data stream. For example, the data processing system can allow content providers to bid for conversational digital component objects to be inserted in different points of a user's conversations with a personal assistant. The data processing system can account for the different nature of the conversational environment with the ability to process, parse or synthesize the context of where the user is in the flexible conversation context. The data processing system can allow a content provider to bid against the entire sequential flow of how the user got to his current place in the conversation, as opposed to merely a keyword, an intent, or previous search terms.

The data processing system can allow content providers to directed digital component objects based on a sequence of interactions within a conversation. The data processing system can receive individual parameters or adjustment parameters against different locations in the conversation as defined by the abstract sequence. The exact sequence of interactions within the conversation can be serialized into attribution data and passed back to the content provider at the point of conversion.

In an illustrative example, a content provider can input a prompt into the data processing system and provide an instruction or indication to the data processing system to cause the data processing system to generate the prompt for a computing device during a type of interaction or sequence of interactions. The instruction can include multiple keywords, which are representative of a location at which the user is in a conversation. The content provider can further enters bids, multipliers or adjustment parameters to be used based on the location within the conversation.

The data processing system can take this input from the content provider and then use the input to execute a real-time digital component selection process at each node (e.g., location) of the conversation. The data processing system can select a possible prompt or digital component object at each node based on the estimated probability of a type of interaction after that node, as well as the adjustment parameter. The prompt or digital component object selected by the data processing system via the executed real-time digital component selection process at the node can be presented to the user via the computing device. The data processing system can instruct the computing device to play an audio file corresponding to the digital component object or prompt, or deliver the digital component object or prompt visually via a display device communicatively coupled to the computing device of the user.

The data processing system can provide, to the computing device, a prompt comprising or generated based on the digital component object input by the content provider. The prompt provided to the computing device can include a command, instruction, hyper text markup, a request or a survey. The prompt can be audio-based or visual based. An interaction with the prompt via the computing device can cause the computing device, or another computing device linked or associated with the computing device, to perform an electronic action such as launch an application or control an application executed by the computing device. The prompt can be generated based on the first digital component object to include some or all of the aspects of the digital component object. For example, if the digital component object includes text, and the output interface is audio, the prompt can be generated using text-to-speech capabilities to output audio generated based on the text. In another example, if the digital component object includes a logo or symbol, and the output interface includes only audio, then the prompt can be generated based only on the text included in the digital component because a symbol or a logo may not be configured for conversion to audio output. In another example, if the output interface includes a visual display, then the data processing system can generate the prompt to include the logo or symbol as well as text of the digital component.

The data processing system can generate a model comprising a node structure. The modal can be structure in the form of a tree. For example, a sequential data stream can map to a tree structure where user input includes a request to order items, for delivery, then specifies household products, then specifies detergent, which can map to being down four nodes in the tree. The sequential data flow may then include going up one level, by including a request for fabric softener, thereby creating a second leaf node. The data processing system can map this sequential data flow to a model where content providers can set parameters to have their digital component objects inserted as a response to particular queries or requests.

To do so, the data processing system can allow a content provider to set or adjust a parameter based on a paired context and a keyword. The data processing system can allow the content provider to position a digital component object within a shopping conversation, for example, in the sequential data flow. The context may itself also be in the form of a keyword, such as a broad match keyword (e.g., indicated by brackets) that the content provider can map to the subject of the conversation. For example if a user is in a shopping conversation and asks for "Brand_A cola" a content provider might target their digital component object to the keyword pair "[shopping], Brand_A cola". This can be referred to as an exact match for Brand_A cola within a conversation where one of the top-level nodes is shopping.

The data processing system can interpret these tuples of keywords in different ways. The data processing system may or may not strictly interpret the tuples of keywords. The content provider can bid for "[shopping], [football], "Brand_A cola" which might be interpreted by the data processing system to apply to a conversation where football and commerce have both come up as subjects, and the user is now looking for Brand_A cola. This example might be a conversation about snacks for an upcoming football game.

The data processing system can process the tuples of keywords in a manner to allow the content provider to bid based on the ordering of different items in the conversation. For example, listing "Brand_A coke" last can instruct the data processing system to show the corresponding digital component object only in response to the "Brand_A cola" node of the conversation, but that the other listed nodes must also have been present. The keywords can allow both broad matching (to concepts) and narrow matching (to exact terms the user uttered) using, for example, markup that the content provider specifies, such as brackets [ ] for broad match.

The content provider can specify bid multipliers to increase or decrease the bid based on the presence of other nodes in the conversation. The digital component object can take the form of an audio prompt, specified by the content provider. The data processing system can monitor a type of interaction, such as whether the computing device performed a type of action responsive to the prompt. For example, the prompt may be "Would you like to shop for this with Store A?" And the compatible action can be navigating to a webpage of Store A, or launching an application programming interface ("API") of store A, or entering a Store A environment via the assistant device. Content providers can further provide webpage or app links to be sent to a nearby device, such as a digital component object specifying a prompt "Would you like to browse detergents on Store_A.com on your phone?" along with a call to action that opens a website on a nearby device.

In some cases, the data processing system can hand off the user of the computing device to the content provider (e.g., sent to the content provider's site or on-device experience) responsive to a "yes" or similar answer, referrer parameters are passed along to the content provider. This can allow the advertiser to maintain records of which digital component objects and associated keywords led to conversion, so that they can optimize their bidding, the types of conversational prompts they make to users, and at what stage in conversations, going forward. The referrer parameters can include only the list of keyword terms and concepts on which the content provider set a parameter that were used to trigger the digital component object, or they can include a fuller set of keywords that describe the conversational interaction.

FIG. 1 illustrates an example system 100 of dynamic sequence-based adjustment of prompt generation via a computer network. Dynamic adjustment can refer to changing, adjusting or otherwise manipulating a parameter used as input into a selection process based on a location in a sequence. The location in a sequence can refer to a node location in a node data structure or tree structure. The node location can be determined based on a sequence of interactions between a computing device 104 and the data processing system 102. For example, the sequence of interactions can refer to or include a voice-based conversation between a user of the computing device 104 and a digital assistant executed by the data processing system 102. The system 100 can perform dynamic sequence-based tuning as opposed to a static process in which the parameter for a digital component object is predetermined or preset based on keywords. Thus, the data processing system 102 can determine the actual sequence of interactions, formulate a sequence-based keyword tuple, and then dynamically, such as at or prior to the real-time selection process, adjust a parameter input into the real-time selection process. Depending on how the sequence of interactions map to a node in the node data structure, the data processing system 102 can determine whether or not to apply the adjustment parameter or what adjustment parameter to apply, and the data processing system 102 can dynamically make this determine based on the current sequence of interactions. For example, if the sequence of interactions indicates a keyword_A followed by keyword_B, then the data processing system 102 can map the sequence to a second node in a node data structure. The second node can include an adjustment parameter for a digital component, which the data processing system 102 can determine to apply to the digital component based on matching the sequence to the second node. However, if the sequence of interactions indicates keyword_B followed by keyword_A, then the data processing system 102 may determine that the sequence does not map to any node or maps to a different, third node that does not include an adjustment parameter. Thus, the data processing system 102 can determine, dynamically based on the sequence, whether or not to apply the adjustment parameter.

The system 100 can include content selection infrastructure. The system 100 can include a data processing system 102. The data processing system 102 can communicate with one or more of a content provider computing device 106, chatbot provider device 108 (that can also be referred to as content publisher device 108), or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a chatbot provider 108 or content provider computing device 106. The computing device 104 may or may not include a display; for example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party digital component objects as part of a digital component object placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the chatbot provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider computing device 106), or the chatbot provider device 108 (or chatbot provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous— one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

A digital assistant provider or chatbot provider can include or refer to a developer, such as an entity that designs, develops, manages, or maintains computer programs that form or provide one or more chatbots or digital assistants. A chatbot or digital assistant can include a computer program that conducts a conversation via auditory, image, or textual methods. The chatbot or digital assistant can be designed to simulate how a human would behave as a conversational partner. Chatbots or digital assistants can be used in dialog systems for customer service or information acquisition. Chatbots digital assistants can include or use natural language processing systems (e.g., natural language processor component 112). The chatbot digital assistants can scan for keywords within an input, and then pull a reply with the most matching keywords, or the most similar wording pattern, from a database. The chatbot digital assistants can be programmed with procedures that utilize pattern-matching to lookup predefined dialog data structures. The chatbot or digital assistant can be programmed with natural language processing techniques to identify a grammar and syntax of input, tokenize input, or otherwise process the input to determine a response.

The content provider computing device 106 can provide audio based digital component objects for display by the client computing device 104 as an audio output digital component object. The digital component object can be or include a digital component. The digital component object can be or include a digital object. The digital component object can include a brand name or company name of a good or service. The digital component object can be configured for a parametrically driven text to speech technique. The digital component object can be configured for a text-to-speech (TTS) implementations that converts normal language text into speech. The digital component object can be input to an application programming interface that utilizes a speech-synthesis capability to synthesize text into natural-sounding speech in a variety of languages, accents, and voices. The digital component object can be coded as plain text or a speech synthesis markup language (SSML). SSML can include parameters that can be set to control aspects of speech, such as pronunciation, volume, pitch, or rate that can form an acoustic fingerprint or native voice.

The content provider computing device 106 can provide the digital component object to the data processing system 102 for storage in the data repository 124 in the content data data structure 130. The data processing system 102 can retrieve the digital component object responsive to a request for content or otherwise determining to provide the digital component object.

The computing device 104 can access a third-party chatbot platform or third party digital assistant platform that is not provided by the data processing system 102. For example, the third party chatbot platform can refer to one or more servers of an entity that is different from the entity that administers or provides the data processing system 102. The third-party chatbot platform can receive computer programs for a chatbot from a chatbot provider device. The third-party chatbot platform can provide natural language processing and other functions. The third-party chatbot platform can interface or communicate with the computing device 104 to provide the chatbot functionality. For example, third-party chatbot platform can execute or run the chatbot provided by the chatbot provider device in order to engage in a conversion with a user of the computing device 104. The third-party chatbot platform can execute on a server remove from the data processing system 102 and computing device 104. In some cases, the third-party chatbot platform can execute at least partially on the computing device 104 (e.g., as part of pre-processor 140). The third-party chatbot platform or digital assistant platform can forward requests for content and associated parameters to the data processing system 102, and relay back to the computing device 104 a selected digital component object for presentation via the computing device 104.

The computing device 104 can include, interface, or otherwise communicate with at least one sensor 134, transducer 136, audio driver 138, or pre-processor 140. The sensor 134 can include, for example, a camera, an ambient light sensor, proximity sensor, temperature sensor, accelerometer, gyroscope, motion detector, GPS sensor, location sensor, microphone, video, image detection, or touch sensor. The transducer 136 can include or be part of a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer-generated voice that can be provided from the data processing system 102 (or the content provider computing device 106 or the chatbot provider computing device 108) to the client computing device 104, output from the transducer 136 (e.g., a speaker). The computer-generated voice can include recordings from a real person or computer generated language.

The client computing device 104 can be associated with an end user that provides audio, text, image or video that can indicate queries as input into the client computing device 104 (via the sensor 134), and receives audio output in the form of a computer-generated voice that can be provided from the data processing system 102 to the client computing device 104, output from the transducer 136 (e.g., a speaker). The input detected by the one or more sensors 134 can include one or more of audio input (e.g., acoustic signal), visual input (e.g., image or video data), motion input or other input. The input (e.g., the one or more of audio, image, visual, or motion input) to the computing device 104 can be converted to a digital file and provided to the data processing system 102 for further processing or to generate actions.

Figure 2:
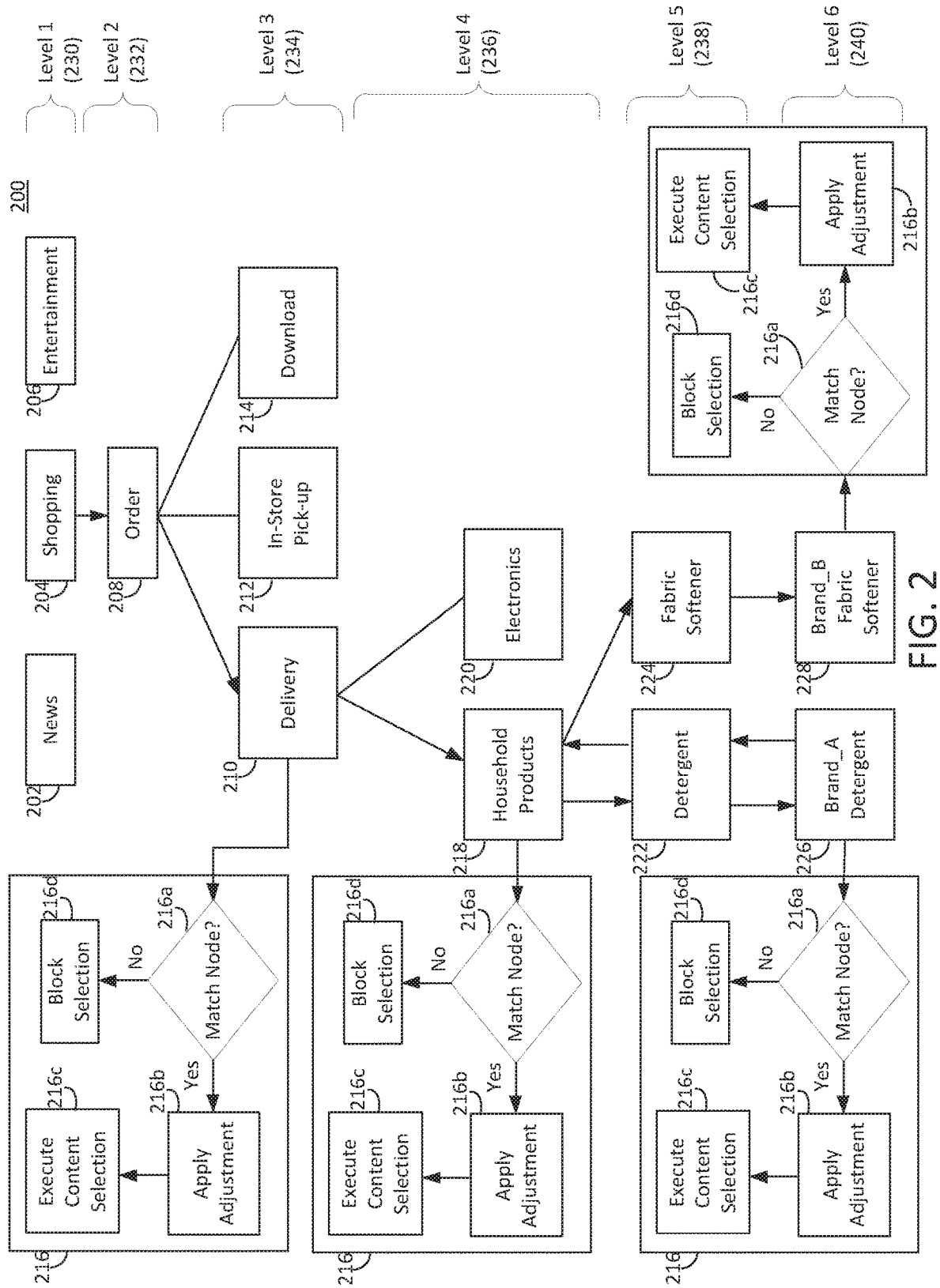
FIG. 2 is an illustration of a flow diagram for dynamic sequence-based prompt generation via a computer network.

The data repository 124 can include one or more local or distributed databases, and can include a database management system. The data repository 124 can include computer data storage or memory and can store one or more profiles 126, one or more indexes 128, content data 130, or model data 132 among other data. The profile 126 can include information about the computing device 104 or an account associated with the computing device 104. The profile 126 can include historical network activity associated with the computing device 104, identifiers of chatbots utilized by computing device 104, a configuration of the computing device 104, device functionality, preferences, or other information associated with the computing device 104 that can facilitate content selection. The index 128 can map previously selected digital component objects to a session identifier, computing device identifier, dialog data structure identifier to facilitate reuse of the digital component object. The content data 130 can include digital component objects for audio output or associated metadata, as well as input audio messages that can be part of one or more communication sessions with the client computing device 104. The model data 132 can include or refer to a node data structure or tree structure comprising nodes that map to sequential data flows, as illustrated in FIG. 2.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one node mapper component 114. The data processing system 102 can include, interface, or otherwise communicate with at least one content selector component 116. The data processing system 102 can include, interface, or otherwise communicate with at least one session handler component 116. The data processing system 102 can include, interface, or otherwise communicate with at least one data repository 124. The at least one data repository 124 can include or store, in one or more data structures or databases, profiles 126, indexes 128, content data 130, or model data 132. Content data 130 can include, for example, content campaign information, content groups, content selection criteria, digital component objects or other information provided by a content provider computing device 106 or obtained or determined by the data processing system to facilitate content selection. The content data 130 can include, for example, historical performance of a content campaign.

The interface 110, natural language processor component 112, node mapper component 114, or content selector component 116 can each include at least one processing unit or other logic device such as programmable logic array engine, or module configured to communicate with the database repository or database 124. The interface 110, natural language processor component 112, node mapper component 114, content selector component 116, and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider computing device 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, digital component object data objects (e.g., digital components or digital objects), and content selection criteria. To create a content campaign, content provider computing device 106 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider computing device 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object or digital component is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component object, or completing an electronic transaction.

The content provider computing device 106 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the digital component object in the presence of the negative keyword on main content), bids for keywords, or parameters associated with the bid or content campaign.

To create a new content group, the content provider computing device 106 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider computing device 106 can use to capture a topic or subject matter for which digital component objects of the content group is to be selected for display. For example, a food and beverage company can create a different content group for each brand of food or beverage it carries, and may further create a different content group for each model of vehicle it carries. Examples of the content group themes that the food and beverage company can use include, for example, "Brand A cola", "Brand B ginger ale," "Brand C orange juice," "Brand D sports drink," or "Brand E purified water." An example content campaign theme can be "soda" and include content groups for both "Brand A cola" and "Brand B ginger ale", for example. The digital component object (or digital component object or digital component) can include "Brand A", "Brand B", "Brand C", "Brand D" or "Brand E". The digital component object or digital component can refer to the digital component object configured for a parametrically driven text to speech technique.

The content provider computing device 106 can provide one or more keywords and digital component objects to each content group. Keywords can include terms that are relevant to the product or services of associated with or identified by the digital component objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select digital component objects.

Further, the content provider computing device 106 can provide pair keywords or tuples of keywords (or keyword tuples). A keyword tuple can refer to a sequence of multiple of keywords. The keyword tuple can refer to a state, such as a conversation state. The keyword tuple can map or match a node in a node data structure (or model), such as node data structure 200 depicted in FIG. 2. The keyword tuple can include symbols, characters or other indicators. The keyword tuple can correspond to a regular expression pattern. The keyword tuple can include brackets [ ] or quotes that can indicate a command or a technique to be utilized for processing the keyword or tuple. The order of keywords in the tuple can indicate a sequential data flow desired by the content provider. The order of keywords in the keyword tuple can map or match a node in the model.

The content provider computing device 106 can provide one or more keywords to be used by the data processing system 102 to select a digital component object provided by the content provider computing device 106. The content provider computing device 106 can identify one or more keywords to bid on, and further provide bid amounts for various keywords. The content provider computing device 106 can provide additional content selection criteria to be used by the data processing system 102 to select digital component objects. Multiple content providers 106 can bid on the same or different keywords, and the data processing system 102 can run a digital component selection process or ad auction responsive to receiving an indication of a keyword of an electronic message.

The content provider computing device 106 can provide one or more digital component objects for selection by the data processing system 102. The data processing system 102 (e.g., via content selector component 116) can select the digital component objects when a content placement opportunity becomes available that matches the resource allocation, content schedule, maximum bids, keywords, and other selection criteria specified for the content group. Different types of digital component objects can be included in a content group, such as a voice digital component object, audio digital component object, a text digital component object, an image digital component object, video digital component object, multimedia digital component object, or digital component object link. Upon selecting a digital component object, the data processing system 102 can transmit the digital component object for rendering on a computing device 104 or display device of the computing device 104. Rendering can include displaying the digital component object on a display device, or playing the digital component object via a speaker of the computing device 104. The data processing system 102 can provide instructions to a computing device 104 to present the digital component object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an application to communicate input audio signals to the interface 110 of the data processing system 102 and to drive components of the client computing device to render output audio signals. The data processing system 102 can receive data packets, a digital file, or other signal that includes or identifies an audio input signal. The computing device 104 can detect the audio signal via the transducer 136, and convert the analog audio signal to a digital file via an analog-to-digital converter. For example, the audio driver 138 can include an analog-to-digital converter component. The input signal can refer to or include an interaction between the computing device 104 (e.g., client device) and the interface 110 of the data processing system 102. Each interaction between the computing device 104 and the interface 110 of the data processing system 102 can include an entry, an input audio signal or an output audio signal. The entries can refer to or include text or queries.

The data processing system 102 can execute or run the NLP component 112 to receive or obtain the digital file comprising the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve. The NLP component 112 can convert image or video input to text or digital files. The NLP component 112 can process, analyze or interpret image or video input to perform actions, generate requests, or select or identify data structures.

The audio input signal (e.g., or interaction) can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) as a digital file or digital format and provided to the NLP component 112 or stored in the data repository 124. In some cases, the data processing system 102 can receive image or video input signals, in addition to, or instead of, input acoustic signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, machine learning techniques can be collectively referred to as imaging techniques. The data processing system 102 (e.g., the NLP component 112) can be configured with the imaging techniques, in addition to, or instead of, audio processing techniques.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to"

from the input audio signal can indicate a need for transport. In this example, the input audio signal (or the identified request) does not directly express an intent for transport, however the trigger keyword indicates that transport is an ancillary action to at least one other action that is indicated by the request.

The data processing system 102 can, upon receiving or detecting the interaction or speech input, establish a session. The session can refer to or include a data exchange session between the client computing device 104 remote from the data processing system 102 and the interface 110 of the data processing system 102. The data exchange session can be a one-way data exchange session, two-way data exchange session, or a multi-way data exchange session. The data processing system 102 can establish the data exchange session responsive to detecting a trigger keyword, hotword, or other feature of an input audio signal or interaction. The data processing system 102 can establish the data exchange session based on authentication or authorization information and an authentication or authorization process. For example, the data processing system 102 can detect a trigger keyword via an initial speech input, and identify, based on the trigger keyword or a characteristic of the initial speech input, an electronic account associated with the client device. The data processing system 102 can establish, responsive to identification of the electronic account, the data exchange session. The data exchange session can refer to or include a conversational data flow between a user of the computing device 104 and the data processing system 102 (e.g., a digital assistant).

The data processing system 102 can establish the data exchange session by determining whether the interaction is associated with an electronic account that is registered with the data processing system 102, or registered for certain types of uses or functions. The data processing system 102 can identify, based on a characteristic of the first interaction, an electronic account associated with the client device. The data processing system 102 can select the attribute from a plurality of attributes of the node based on the electronic account. For example, an audio or acoustic or voice fingerprint associated with the input audio signal or speech can be associated with an electronic account that is registered with the data processing system 102. The data processing system 102 can store the voice fingerprint in a data repository 124, such as in profile 126.

Upon detecting the first interaction between the computing device 104 and the data processing system 102, the data processing system 102 can establish the data exchange session. The data processing system 102 can, upon identifying the second interaction, determine the second interaction is part of the same data exchange session established responsive to the first interaction. The data processing system 102, upon identifying that the first and second interactions are part of the same data exchange session, identify a first sequence based on the first interaction and the second interaction.

For example, the digital assistant or chatbot can, upon execution, identify one or more interactions or entries responsive to the speech or text input using a natural language processing technique, search engine technique, pattern matching technique, or semantic analysis technique. For example, the NLP component 112 can detect the interaction including an input audio signal, parse the input audio signal to identify, determine, retrieve, or otherwise obtain the request and the trigger keyword. For instance, the NLP component 112 can apply a semantic processing technique to the input audio signal to identify keywords or trigger phrases. The NLP component 112 can filter the input audio signal to identify the trigger keyword.

The data processing system 102 can include a node mapper component 114 designed and constructed to receive the interactions, entries, or queries determined by the NLP component 112. The node mapper component 114 can obtain a first query comprising one or more keywords identified by the NLP component 112. The node mapper component 114 can perform a lookup in the model data structure 132 in data repository 124 to identify a model or node data structure that maps or matches to the first interaction, first query, or one or more keywords thereof. The node mapper component 114 can select the node data structure or model for further processing.

For example, the node data structure or model can include a tree structure with multiple nodes. The node mapper component 114 can be configured to perform a digital component object selection process at each node. In some cases, prior to performing a digital component object selection process at a node, the node mapper component 114 can perform a decision procedure, such as decision procedure 216 depicted in FIG. 2.

The node mapper component 114 can receive a second interaction (or second entry) determined by the NLP component 112. The second interaction or second entry can be subsequent to the first interaction or first entry. The first and second interactions or entries can correspond to speech input detected by a microphone of the computing device. The node mapper component 114 can determine that the second interaction and the first interaction as part of the same data exchange session based on one or more factors, such as a context of the interactions, keywords of the interactions, duration between the interactions (e.g., less than 1 minute, 2 minutes, 3 minutes, 5 minutes, 10 minutes, 20 minutes, 30 minutes or more), authentication information, or an indication that the second interaction is part of the same session or a request to resume the data exchange session. For example, the data processing system 102 can detect the first interaction via the data exchange session at a first time stamp. The data processing system 102 can detect the second interaction at a second time stamp. The data processing system 102 can generate, based on a difference between the second time stamp and the first time stamp less than or equal to a threshold, the first sequence comprising the first interaction and the second interaction. In the event the data processing system 102 detects a subsequent interaction (e.g., a fourth interaction) having a time stamp that is outside the threshold relative to a preceding interaction or the interaction that initiated the session, the data processing system 102 can determine to block generation of a sequence with the subsequent or fourth interaction, in order to reduce excessive data processing or an erroneous or faulty digital component object selection process, thereby reducing resource consumption or preventing unnecessary or wasted computing resource utilization.

The node mapper component 114 can map the second entry to the previously selected node data structure or model based on the first query, or to a new node data structure or model. The node mapper component 114 map the combination of the first query and the second query to a node in a model or node data structure that may be one or more levels down from the previously matching node.

For example, the node mapper component 114 can form a first sequence constructed from the first interaction and the second interaction (e.g., first entry and the second entry). The first sequence can be referred to as a keyword tuple, tuple of keywords, or pair of keywords. The node mapper component 114 can map the first sequence to the model that includes multiple nodes. The node mapper component 114 can further identify a node of the multiple of nodes in the model that matches the first sequence.

The identified node can include an attribute having a keyword tuple. The node can be configured with various attributes, such as keywords, context, topics, verticals or other information. The node can include one or more attributes. The node can include information about a location of the node in the node data structure. The node can include relationship information, such as a relation between a node and other nodes in the node data structure.

Responsive to a match between the first sequence and the node in the model or node data structure, the node mapper component 114 can instruct or command the content selector component 116 to perform a digital component selection process. The content selector component 116 can perform a digital component selection process to identify one or more digital component objects that match the first sequence, such as the keyword tuple. For example, the matching digital component objects can have content selection parameter that match the keyword tuple that corresponds to the node in the model that corresponds to the first sequence constructed from the entries determined by the NLP component 112.

The data processing system 102 can include, execute, or otherwise communicate with a content selector component 116 to receive the keyword tuple (or first sequence) identified by the node mapper component 114 and select multiple digital component objects via a real-time digital component selection process. The digital component selection process can refer to, or include, selecting sponsored digital component objects provided by third party content providers 106. A digital component object can refer to or include a content item, such as a sponsored content item. The real-time digital component selection process can include a service in which digital component objects provided by multiple content providers are parsed, processed, weighted, or matched in order to select one or more digital component objects to provide to the computing device 104. The content selector component 116 can perform the digital component selection process in real-time. Performing the digital component selection process in real-time can refer to performing the digital component selection process responsive to a request for content received via the client computing device 104. The real-time digital component selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time digital component selection process can be performed during a communication session with the client computing device 104, or within a time interval after the communication session is terminated.

The content selector component 116 can identify, analyze, or recognize voice, audio, terms, characters, text, symbols, or images of the candidate digital component objects using an image processing technique, character recognition technique, natural language processing technique, or database lookup. The candidate digital component objects can include metadata indicative of the subject matter of the candidate digital component objects, in which case the content selector component 116 can process the metadata to determine whether the subject matter of the candidate digital component object corresponds to the input audio signal.

Content providers 106 can provide additional indicators such as keyword tuple or keyword pairs or adjustment parameters to be triggered based on same when setting up a content campaign that includes digital component objects. The content provider computing device 106 can provide information at the content campaign or content group level that the content selector component 116 can identify by performing a lookup using information about the candidate digital component object. For example, the candidate digital component object may include a unique identifier, which may map to a content group, content campaign, or content provider. The content selector component 116 can determine, based on information stored in content campaign data structure in data repository 124, information about the content provider computing device 106.

The content selector component 116 can determine that a first digital component object of the multiple digital component objects includes an adjustment parameter. The adjustment parameter can be applied to a parameter of the first digital component object to result in an adjusted parameter of the digital component object. The adjustment parameter can be configured to be triggered responsive to a match between a keyword tuple of the first digital component object and the attribute of the node in the model. The attribute of the node can refer to the keyword tuple of the node. The adjustment parameter can include a function, multiplier, divisor, exponent, addend, conditional statement, or other manipulation of the parameter. The parameter can include a numeric value, string, keyword, character decision logic, rule, conditional statement, inequality.

The content selector component 116 can then apply or trigger application of, responsive to the match between the keyword tuple of the first digital component object and the attribute of the node in the model, the adjustment parameter for the first digital component object to cause generation of an adjusted parameter for the first digital component object. The content selector component 116 can apply the adjustment parameter to a parameter of the first digital component object. The adjustment parameter can be a weight, score, value, bid, modifier, factor or other parameter that can tune or affect a subsequent digital component selection process. The data processing system 102 can generate the adjusted parameter for the first digital component object based on a location of the node in the model. The data processing system 102 can generate the adjusted parameter for the first digital component object based on a location of the node in the node data structure (e.g., increase a weight if the node is lower or deeper in the tree, or decrease the weight if the node is higher in the tree). Thus, the adjusted parameter can be applied based on a conversational sequence of interactions between a user of a computing device 104 and a digital assistant provided by the data processing system 102.

The content selector component 116 can then execute a real-time digital component selection process among the multiple digital component objects. The real-time digital component selection process can utilize the adjusted parameter generated for the first digital component object to result in selection of the first digital component object. The content selector component 116 can generate, responsive to the selection of the first digital component object based on the adjusted parameter triggered responsive to the match between the keyword tuple of the first digital component object and the attribute of the node in the model, a prompt based on the first digital component object. The data processing system 102 can execute the real-time digital component selection process among the plurality of digital component objects. The real-time digital component selection process can include the adjusted parameter generated for the first digital component object to result in selection of the first digital component object.

The data processing system can generate, responsive to the selection of the first digital component object based on the adjusted parameter applied responsive to the match between the keyword tuple of the first digital component object and the attribute of the node in the node data structure, a prompt comprising the first digital component object. The data processing system 102 can then transmit the prompt to a client device to cause the client device to present the prompt. The data processing system 102 can transmit the prompt with audio output of the digital component object to cause the client device to present the digital component object with the audio output via a speaker communicatively coupled with the client device. The digital component object can include audio. The data processing system 102 can transmit the prompt with the audio of the first digital component object to cause the client device to present the first digital component object with the audio output via a speaker communicatively coupled with the client device.

Transmitting the prompt to the client device can cause the client computing device 104 to present the prompt and initiate a third interaction via the data exchange session with the data processing system 102. For example, the data processing system 102 can cause the client device to initiate the third interaction via the data exchange session to terminate the data exchange session with the data processing system. The termination of the data exchange session with the data processing system 102 can refer to or include completing the session between the client computing device 104 and the data processing system 102, and then initiating a new data exchange session between a content provider device 106 and the computing device 104. Terminating the session can refer to or include pausing the session while entering or initiating a new, different session. The multiple sessions can be serial to one another, mutually exclusive, or overlapping.

The client computing device 104 can initiate the third interaction via the data exchange session to exit the node data structure comprising the plurality of nodes. For example, the third interaction may include entries that do not map to the node structure, and cause the data processing system 102 to select a different node structure. The data processing system 102 can map the third interaction to a second node data structure different from the node data structure.

The data processing system 102 can identify a second sequence constructed from the second entry and a third entry. The third entry can be subsequent to the second entry. The data processing system 102 can identify a second node in the model. The data processing system 102 can execute a second real-time digital component selection process with a second plurality of digital component objects matching the second node. The second plurality of digital component objects can include a second digital component object with a second adjusted parameter generated based on a second adjustment parameter triggered responsive to a match between a keyword tuple of the second digital component object and an attribute of the second node in the model. The second real-time digital component selection process can utilize the second adjusted parameter generated for the second digital component object to result in selection of the second digital component object.

The data processing system 102 can receive a request for content for provision via a computing device 104. The request can include selection criteria of the request, such as the device type, location, and a keyword associated with the request. The request can include the dialog data structure.

Responsive to the request, the data processing system 102 can select a digital component object from data repository 124 or a database associated with the content provider computing device 106, and provide the digital component object for presentation via the computing device 104 via network 105. The digital component object can be provided by a content provider device 108 different from the chatbot provider device 108. The computing device 104 can interact with the digital component object. The computing device 104 can receive an audio response to the digital component object. The computing device 104 can receive an indication to select a hyperlink or other button associated with the digital component object that causes or allows the computing device 104 to identify content provider computing device 106, request a service from the content provider computing device 106, instruct the content provider computing device 106 to perform a service, transmit information to the content provider computing device 106, or otherwise identify a good or service associated with content provider computing device 106.

The content selector component 116 can select a digital component object that includes text, string, or characters that can be processed by a text to speech system. The content selector component 116 can select a digital component object that is in a parameterized format configured for a parametrically driven text to speech technique. In some cases, the dialog data structure can be in SSML format or be configured with voice parameters. The data processing system 102 can configure the voice parameters of the digital component object to match the voice parameters of the dialog data structure identified by the chatbot such that the digital component object can be presented to the user of the computing device 104 with a native voice, image, or acoustic fingerprint (e.g., the digital component object has the same or similar acoustic properties as compared to the dialog data structure without the digital component object).

The content selector component 116 can select a digital component object that is in a parameterized format configured for text to speech instead of a digital component object that is in an audio file format. For example, the content selector component 116 may not select a digital component object in an audio file in an audio file format or audio coding format, such as .WAV, .AIFF, or .AU, because a digital component object already in an audio file format may not be configured for seamless insertion into the placeholder field of the dialog data structure identified by the chatbot computer program. A digital component object in an audio file format may have a different acoustic fingerprint as compared to a native voice of the computing device or the acoustic fingerprint set for the chatbot. If the digital component object audio file has a different acoustic fingerprint as compared to the native voice or acoustic fingerprint of the chatbot or the dialog data structure (e.g., words are spoken at different rate, at a different frequency, different pitch, different tone, different volume, or different accent), then inserting or integrating the digital component object audio file into the placeholder field in the dialog data structure may not be seamless, smooth or continuous. For example, the digital component object audio file having the different acoustic fingerprint can cause awkward transitions or indication of disparity. Thus, by providing the digital component object configured for a text to speech technique in which the chatbot or computing device can play the digital component object in a manner that corresponds to the acoustic fingerprint or native voice of the chatbot or computing device, the data processing system 102 can facilitate providing the seamless modification of chatbot computer program output.

The content selector component 116 can provide the selected digital component object to the chatbot to cause the computing device to perform the text to speech technique to generate an acoustic signal corresponding to the dialog data structure modified with the selected digital component object. In some cases, the data processing system 102 can transmit data packets corresponding to the digital component object. The data processing system 102 can transmit data packets corresponding to the dialog data structure modified with the digital component object.

FIG. 2 is an illustration of a flow diagram for dynamic sequence-based prompt generation via a computer network. The flow can be performed by one or more component of system 100 depicted in FIG. 1, including, for example, the data processing system 102, NLP component 112, node mapper component 114 or content selector component 116.

The flow diagram depicts the flow through a model 200. The model 200 includes a tree structure with multiple nodes and levels. In level 1 (230), the nodes are news 202, shopping 204 and entertainment 206. In level 2 (232), the node is order 208. In level 3 (234), the nodes are deliver 210, in-store pick-up 212, and download 214. In level 4 (236), the nodes are household products 218 and electronics 220. In level 5 (238), the nodes are detergent 222 and fabric softener 224. In level 6 (240) the nodes are brand_A detergent 226 and brand_B fabric softener 228.

The data processing system 102 (e.g., via node mapper component 114) can construct sequences from entries identified based on speech input from a user to map the state of the conversation to a node in the model 200. At a node in the model 200, the data processing system 102 can execute a decision process 216. In decision process 216, the data processing system 102 can determine whether digital component objects include a keyword pair or keyword tuple that matches the keyword tuple of the node (ACT 216a). If the keyword tuple of the node matches the keyword tuple of one or more digital component objects, then the data processing system 102 can identify an adjustment parameter of a the matching digital component object and apply the adjustment parameter (ACT 216b). At ACT 216c, the data processing system 102 can execute a real-time digital component selection process using the adjusted parameter.

If, however, the data processing system 102 does not identify any digital component objects having keyword tuples matching the keyword tuple of the node (ACT 216a), the data processing system 102 can proceed to block a content selection at that node (ACT 216d), thereby reducing the number of digital component selection processes, RPCs, memory usage and bandwidth usage for that node.

In an example flow illustrated in FIG. 2, the conversation can proceed from node 204 to node 208 to node 210 to node 218 to node 222 and to node 226. The data processing system 102 may determine that the only matching keyword tuple (ACT 216a) occurred at node 226 and execute the digital component selection process for node 226.

Subsequent to executing the digital component selection process at node 226, the data processing system 102 can receive another entry. The data processing system 102 can map the subsequent entry to a level up, back to node 222 or directly to node 218, and then to node 224 and finally node 228. At node 228, the data processing system 102 can determine another matching tuple and execute a second digital component selection process for this second sequence.

Figure 3:
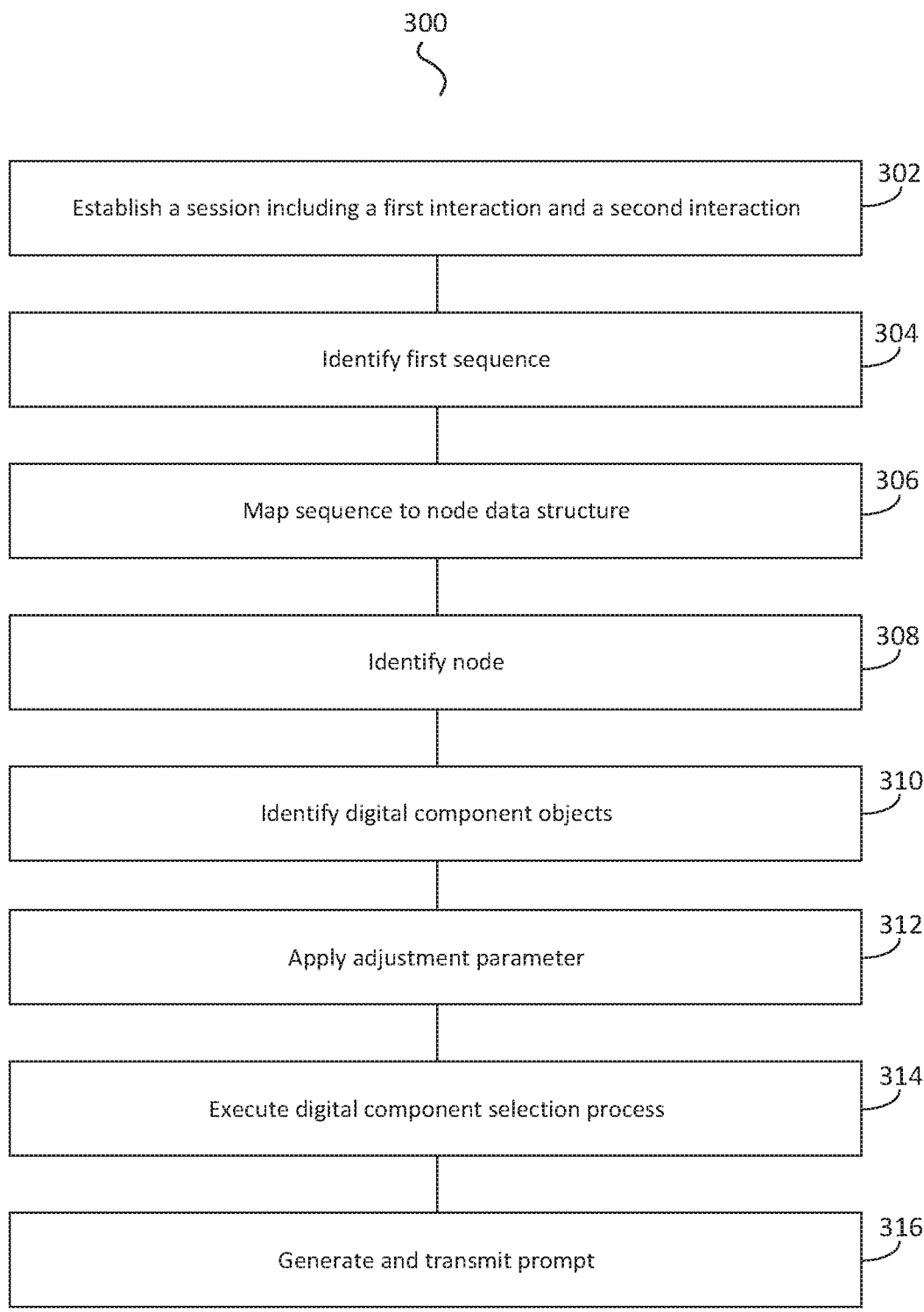
FIG. 3 is an illustration of a method for dynamic sequence-based prompt generation via a computer network.

FIG. 3 is an illustration of a method for dynamic sequence-based prompt generation via a computer network. The method 300 can be performed by one or more component of system 100 depicted in FIG. 1, including, for example, the data processing system 102, NLP component 112, node mapper component 114 or content selector component 116.

At 302, the data processing system can establish a session including a first interaction and a second interaction. The data processing system can receive a first entry and a second entry. The entries can correspond to speech input detected by a computing device and parsed by a NLP component. For example, the data processing system can establish a data exchange session between a client device remote from the data processing system and an interface of the data processing system. The data processing system can detect, via the data exchange session, a first interaction between the client device remote and the interface of the data processing system. The data processing system can detect, via the data exchange session, a second interaction between the client device and the interface of the data processing system.

At 304, the data processing system can identify a first sequence based on the first entry and the second entry. At 306, the data processing system can map the first sequence to a model (or node data structure) comprising a plurality of nodes. At 308, the data processing system can identify a node of the plurality of nodes in the model that matches the first sequence.

At 310, the data processing system can identify, responsive to a match between the first sequence and the node in the model, a plurality of digital component objects comprising keyword tuples corresponding to an attribute of the node. The data processing system can determine that a first digital component object of the plurality of digital component objects includes an adjustment parameter configured to be triggered responsive to a match between a keyword tuple of the first digital component object and the attribute of the node in the model.

At 312, the data processing system can apply, responsive to a match between the keyword tuple of the first digital component object and the attribute of the node in the node data structure, the adjustment parameter to the first digital component object to provide an adjusted parameter for the first digital component object. The data processing system can trigger, responsive to the match between the keyword tuple of the first digital component object and the attribute of the node in the model, the adjustment parameter for the first digital component object to cause generation of an adjusted parameter for the first digital component object. At 314, the data processing system can execute a real-time digital component selection process among the plurality of digital component objects, wherein the real-time digital component selection process utilizes the adjusted parameter generated for the first digital component object to result in selection of the first digital component object.

At 316, the data processing system can generate, responsive to the selection of the first digital component object based on the adjusted parameter triggered responsive to the match between the keyword tuple of the first digital component object and the attribute of the node in the model, a prompt comprising the first digital component object. At 316, the data processing system can transmit the prompt to a client device to cause the client device to present the prompt. The data processing system can transmit the prompt to the client device to cause the client device to present the prompt and initiate a third interaction via the data exchange session.

Figure 4:
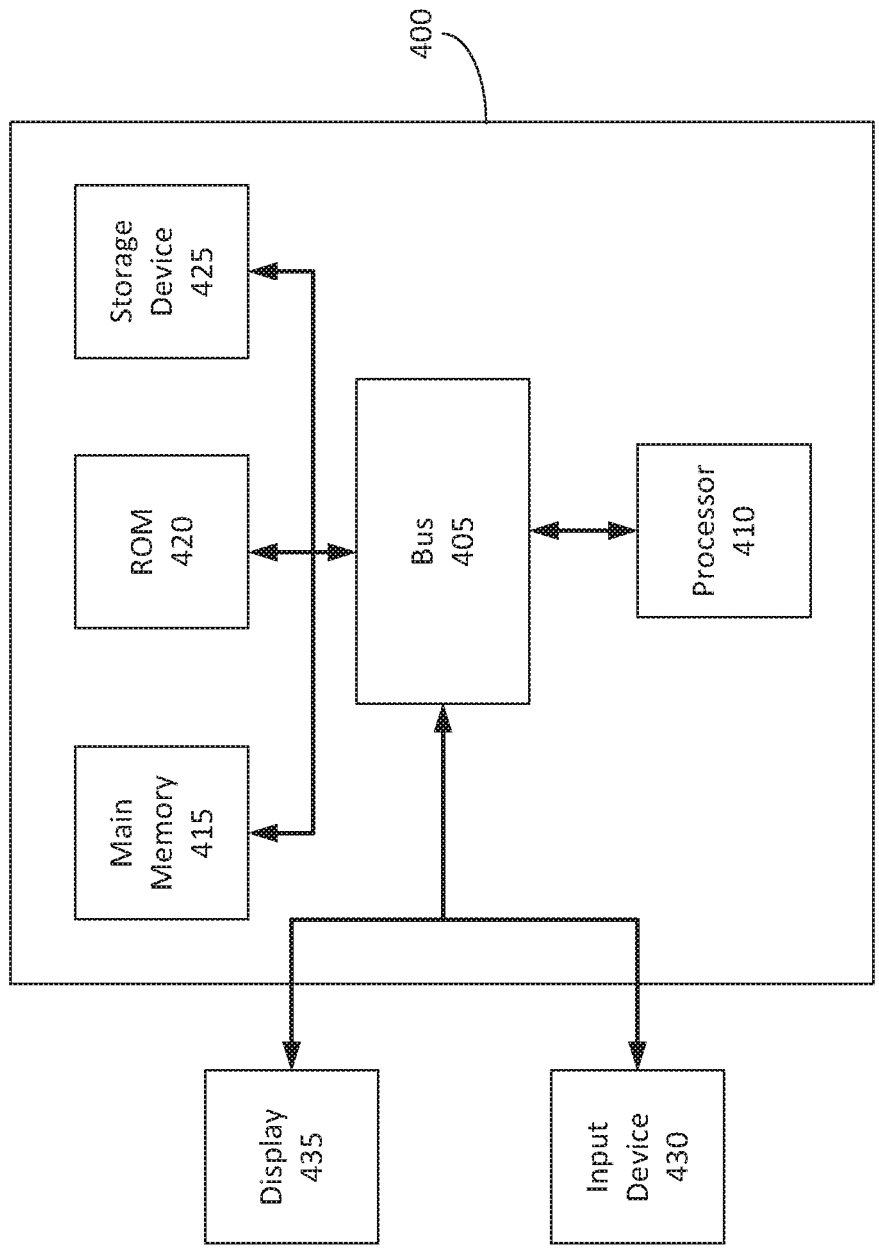
FIG. 4 is a block diagram illustrating a general architecture for a computer system that can be employed to implement elements of the systems and methods described and illustrated herein.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid-state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, content selector component 116, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a digital component object) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the content provider computing device 106 or the chatbot provider computing device).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 116, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can select a digital component object for a subsequent action (e.g., for the third action 215) based in part on data from a prior action in the sequence of actions of the thread 200, such as data from the second action 210 indicating that the second action 210 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
    a data processing system comprising memory and one or more processors to:
    establish a data exchange session with a client device remote from the data processing system;
    detect, via the data exchange session, a plurality of interactions between the client device and the data processing system;
    select, based on the plurality of interactions, a node of a plurality of nodes in a node data structure, the node having an attribute;
    identify, responsive to selection of the node having the attribute, a plurality of digital component objects corresponding to the attribute of the node of the plurality of nodes in the node data structure;
    generate, by the data processing system, an adjustment parameter for a first digital component object of the plurality of digital component objects based on a location of the node data structure;
    apply, by the data processing system, the adjustment parameter to a parameter of the first digital component object to provide an adjusted parameter for the first digital component object, wherein the adjustment parameter causes a real-time digital component selection process to select a first digital component object of the plurality of digital component objects;
    select, based on the real-time digital component selection process executed with the plurality of digital component objects, the real-time digital component selection process comprising the adjusted parameter generated for the first digital component object, the first digital component object;
    generate, responsive to the selection of the first digital component object based on the adjusted parameter applied responsive to a match between the attribute of the digital component object and the attribute of the node in the node data structure, a prompt for the first digital component object; and
    transmit the prompt to the client device to cause the client device to present the prompt and initiate an interaction subsequent to the plurality of interactions via the data exchange session.

2. The system of claim 1, comprising the data processing system to:
    identify a first sequence based on a first interaction of the plurality of interactions and a second interaction of the plurality of interactions; and
    select the node based on a map of the first sequence comprising the first interaction and the second interaction to the node data structure comprising the plurality of nodes.

3. The system of claim 1, comprising the data processing system to:
    identify a first sequence from the plurality of interactions; and
    select the node of the plurality of nodes in the node data structure based on the first sequence matching the node.

4. The system of claim 1, comprising the data processing system to:
    identify a keyword tuple associated with the attribute of the node; and
    identify the plurality of digital component objects that match the keyword tuple associated with the attribute of the node.

5. The system of claim 1, comprising:
    the data processing system to, prior to selection of the first digital component object via the real-time digital component selection process, apply the adjustment parameter to the first digital component object to cause the real-time digital component selection process to select the first digital component object.

6. The system of claim 5, comprising:
    the data processing system to generate the adjustment parameter for the first digital component object based on a location of the node in the node data structure.

7. The system of claim 1, wherein the plurality of interactions comprise speech input detected by the client device.

8. The system of claim 1, comprising:
    the data processing system to provide a digital assistant to interact with the client device, wherein the plurality of interactions correspond to speech input detected by a microphone of the client device.

9. The system of claim 1, wherein the first digital component object comprises audio, comprising:
    the data processing system to transmit the prompt with the audio of the first digital component object to cause the client device to present the first digital component object with the audio via a speaker communicatively coupled with the client device.

10. The system of claim 1, comprising the data processing system to:
    receive, from the client device, speech input;
    determine a characteristic of the speech input;
    identify, based on the characteristic of the speech input, an electronic account associated with the client device; and
    establish, responsive to identification of the electronic account, the data exchange session.

11. The system of claim 10, comprising the data processing system to:
    select the attribute from a plurality of attributes of the node based at least in part on the electronic account identified based on the characteristic of the speech input.

12. A method, comprising:
    establishing, by a data processing system comprising one or more processors, a data exchange session with a client device remote from the data processing system;

detecting, by the data processing system via the data exchange session, a plurality of interactions between the client device and the data processing system;

selecting, by the data processing system based on the plurality of interactions, a node of a plurality of nodes in a node data structure, the node having an attribute;

identifying, by the data processing system responsive to selection of the node having the attribute, a plurality of digital component objects corresponding to the attribute of the node of the plurality of nodes in the node data structure;

generating, by the data processing system, an adjustment parameter for a first digital component object of the plurality of digital component objects based on a location of the node data structure;

applying, by the data processing system, the adjustment parameter to a parameter of the first digital component object to provide an adjusted parameter for the first digital component object, wherein the adjustment parameter causes a real-time digital component selection process to select a first digital component object of the plurality of digital component objects;

selecting, by the data processing system based on the real-time digital component selection process executed with the plurality of digital component objects, the real-time digital component selection process comprising the adjusted parameter generated for the first digital component object, the first digital component object;

generating, by the data processing system responsive to the selection of the first digital component object based on the adjusted parameter applied responsive to a match between the attribute of the digital component object and the attribute of the node in the node data structure, a prompt for the first digital component object; and transmitting, by the data processing system, the prompt to the client device to cause the client device to present the prompt and initiate an interaction subsequent to the plurality of interactions via the data exchange session.

13. The method of claim 12, comprising:
identifying, by the data processing system, a first sequence based on a first interaction of the plurality of interactions and a second interaction of the plurality of interactions; and
selecting, by the data processing system, the node based on a map of the first sequence comprising the first interaction and the second interaction to the node data structure comprising the plurality of nodes.

14. The method of claim 12, comprising:
identifying, by the data processing system, a first sequence from the plurality of interactions; and
selecting, by the data processing system, the node of the plurality of nodes in the node data structure based on the first sequence matching the node.

15. The method of claim 12, comprising:
identifying, by the data processing system, a keyword tuple associated with the attribute of the node; and
identifying, by the data processing system, the plurality of digital component objects that match the keyword tuple associated with the attribute of the node.

16. The method of claim 12, comprising:
applying, by the data processing system prior to the selection of the first digital component object via the real-time digital component selection process, the adjustment parameter to the first digital component object to cause the real-time digital component selection process to select the first digital component object.

17. The method of claim 16, comprising:
generating, by the data processing system, the adjustment parameter for the first digital component object based on a location of the node in the node data structure.

18. The method of claim 12, comprising:
providing, by the data processing system, a digital assistant to interact with the client device, wherein the plurality of interactions correspond to speech input detected by a microphone of the client device.

19. The method of claim 12, wherein the first digital component object comprises audio, comprising:
transmitting, by the data processing system, the prompt with the audio of the first digital component object to cause the client device to present the first digital component object with the audio via a speaker communicatively coupled with the client device.

20. The method of claim 12, comprising:
receiving, by the data processing system from the client device, speech input;
determining, by the data processing system, a characteristic of the speech input;
identifying, by the data processing system based on the characteristic of the speech input, an electronic account associated with the client device;
establishing, by the data processing system, responsive to identification of the electronic account, the data exchange session; and
selecting, by the data processing system, the attribute from a plurality of attributes of the node based at least in part on the electronic account identified based on the characteristic of the speech input.

* * * * *